United States Patent [19]

Hansen et al.

[11] 4,244,012
[45] Jan. 6, 1981

[54] LAMP HOLDER FOR PROJECTION ALIGNER

[75] Inventors: Magnus B. Hansen; Walter T. Novak, both of San Jose, Calif.

[73] Assignee: Computervision Corporation, Bedford, Mass.

[21] Appl. No.: 920,289

[22] Filed: Jun. 29, 1978

[51] Int. Cl.³ ............................................. F21S 5/00
[52] U.S. Cl. .................................. 362/216; 362/218; 362/264; 362/294; 362/306; 362/416
[58] Field of Search ................ 362/216, 217, 218, 2.3, 362/264, 294, 306, 416

[56] References Cited

U.S. PATENT DOCUMENTS

| | | | |
|---|---|---|---|
| 2,001,495 | 5/1935 | Krefft | 362/218 |
| 2,423,858 | 7/1947 | Vang | 362/264 |
| 2,839,673 | 6/1958 | Wilcoxon | 362/264 |
| 3,265,885 | 8/1966 | Porter | 362/218 |
| 3,869,605 | 6/1970 | Davis | 362/264 |

Primary Examiner—Harold J. Tudor
Attorney, Agent, or Firm—Richard J. Birch

[57] ABSTRACT

A lamp holder that compensates for thermally induced expansion of an arcuate lamp is disclosed. Each end of the arcuate lamp is secured to a relatively flexable lamp support. In the preferred embodiment the lamp support at one end is moveable generally in a plane containing the arcuate lamp, while the lamp support at the other end is moveable generally in a plane that intersects the plane of the lamp. The resulting horizontal and vertical freedom of movement compensates for thermal expansion of the lamp during lamp operation. Both lamp supports are mounted on a lamp holder base, having a plurality of locator pin apertures therein that are cooperatively operative with locator pins positioned on the base of a lamp holder housing. The locator pins and locator pin apertures accurately position the arcuate lamp with respect to an optical system. Forced fluid cooling of the lamp is provided through the lamp holder housing.

8 Claims, 5 Drawing Figures

LAMP HOLDER FOR PROJECTION ALIGNER

BACKGROUND OF THE INVENTION

The present invention relates to lamp holders in general and, more particularly, to a lamp holder that provides an accurate positioning of an arcuate lamp with compensation for thermal expansion of the lamp during operation.

High intensity arcuate lamps are used in the semi-conductor industry as a light source for mask-to-wafer projection printers. The arcuate lamp must be accurately positioned with respect to the optical system of the projection printer. In addition, the lamp must be easily replaceable in the projection printer. Provisions must also be made for providing electrical power to the lamp and a flow of coolant fluid around the lamp during the lamp operation.

It is accordingly a general object of the present invention to provide an improved lamp holder for an arcuate lamp.

It is a specific object of the invention to provide a lamp holder for an arcuate lamp that accurately positions the lamp with respect to an optical system.

It is another object of the present invention to provide a lamp holder that is easily replaceable without sacrificing the positional accuracy of the lamp with respect to an optical system.

It is still another object of the present invention to provide a lamp holder for an arcuate lamp that compensates for thermally induced expansion of the lamp.

It is a feature of the invention that the lamp holder configuration provides a convenient handle to grip the holder without touching the arcuate lamp.

It is another feature of the invention that the lamp holder can be fabricated easily from readily available materials.

It is still another feature of the invention that replacement of coolant supply hoses, electrical power leads, and the lamp holder and lamp does not affect the positional location of the lamp with respect to an optical system.

BRIEF DESCRIPTION OF THE INVENTION

The lamp holder assembly comprises an arcuate lamp and a holder having two electrically conductive, relatively flexible lamp supports that are removably secured to the ends of the arcuate lamp. The lamp holder has two locator pin aperatures that cooperate with locator pins on a lamp assembly housing. When the lamp holder is positioned on the locator pins, the arcuate lamp rests within a corresponding arcuate channel formed in the lamp assembly housing. A gasketed, removably secured cover unit provides a fluid-tight seal for the lamp assembly housing. The cover has a circular window located in superposed relation with respect to the arcuate lamp.

DETAILED DESCRIPTION OF THE DRAWINGS

The objects and features of the invention set forth above and other objects and features of the invention will best be understood from a detailed description of a preferred embodiment thereof, selected for purposes of illustration, and shown in the accompanying drawings, in which.

DETAILED DESCRIPTION OF A PREFERRED EMBODIMENT

Figure 1:
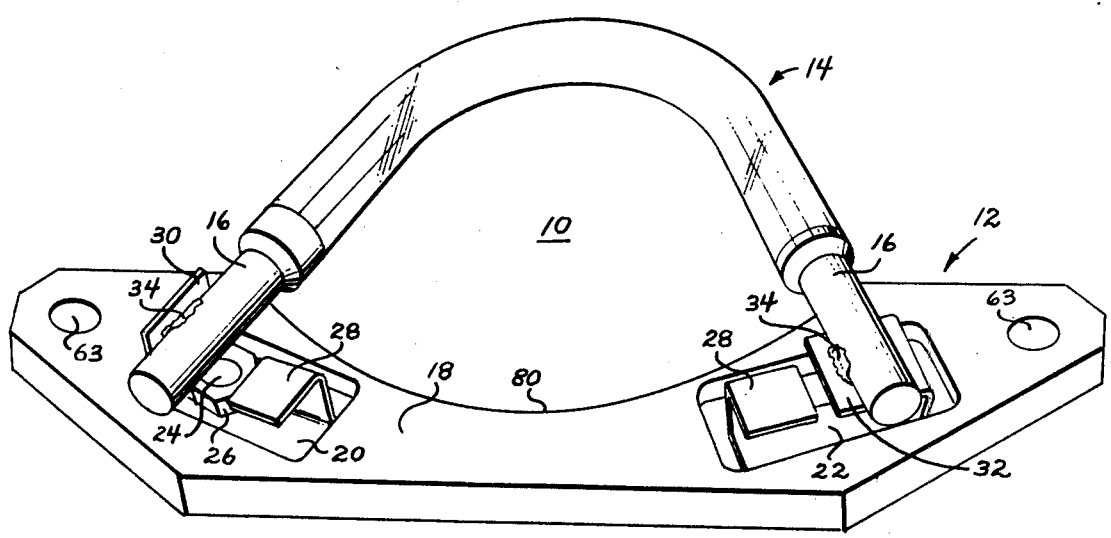
FIG. 1 is a view in perspective showing a lamp holder assembly comprising an arcuate lamp and lamp holder.

Turning now to the drawings and particularly to FIG. 1 thereof, there is shown in perspective view a lamp holder assembly indicated generally by the reference numeral 10. The lamp holder assembly 10 comprises two major components, a lamp holder 12 and an arcuate lamp 14. Typically, lamp 14 is a capillary lamp having a gas within the capillary. The ends of lamp 14 are sealed by electrically conductive ferrules 16 that are an electrically conductive contact with the gas in the lamp capillary.

The lamp holder 12 has a base 18 on which are mounted electrically conductive lamp supports 20 and 22. The lamp supports are secured to the base 18 by conventional means, such as, by screw 24 and nut 26. If the lamp holder base 18 is electrically conductive, the electrically conductive lamp supports 20 and 22 must be insulated from the base. Both lamp supports have a terminal 28 that is designed to receive a "push-on" type electrical power connector.

The lamp supports 20 and 22 have flexible lamp support portions 30 and 32, respectively. The lamp ferrules 16 are secured to the flexible lamp portions 30 and 32 by means of solder 34. Looking at FIG. 1, it can be seen that lamp support 30 extends upwardly in a vertical direction, while lamp support 32 extends in a horizontal direction. Since both support portions are relatively flexible, it will be appreciated that, during operation, thermal expansion of lamp 14 is compensated for by the movement of the flexible lamp support portions 30 and 32. Lamp support portion 30 provides for movement generally in the plane of the arcuate lamp 14, while flexible lamp support portion 32 provides for movement generally in a plane that intersects the plane containing the lamp 14. It will be appreciated that the thermal expansion of the lamp also can be compensated for through the use of two flexible lamp supports 30 or two flexible lamp supports 32. Preferably, the previously described combination of supports 30 and 32 is employed. The lamp supports can be secured to the lamp ends and then attached to the base 18 or vice versa.

Figure 5:
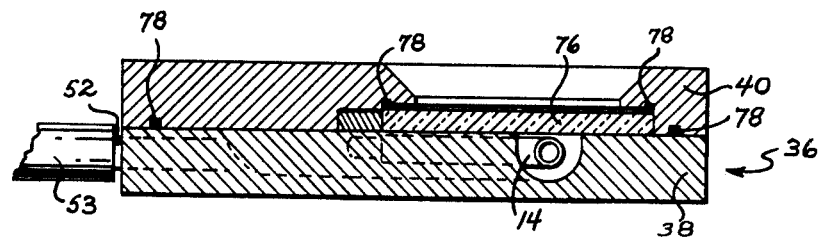
FIG. 5 is a view in section of the assembled lamp holder assembly housing taken along line 5—5 in FIG. 2.

Referring now to FIGS. 2 through 5, the lamp holder assembly 10 is mounted within a lamp holder assembly housing indicated generally by the reference numeral 36 and in FIG. 5. The lamp holder assembly housing 36 has a base 38 and cover 40 that are assembled in superposed relation as shown in FIG. 5. The housing base 39 is shown in plan view in FIG. 2, while the housing cover 40 is shown in a bottom view in FIG. 3.

Figure 2:
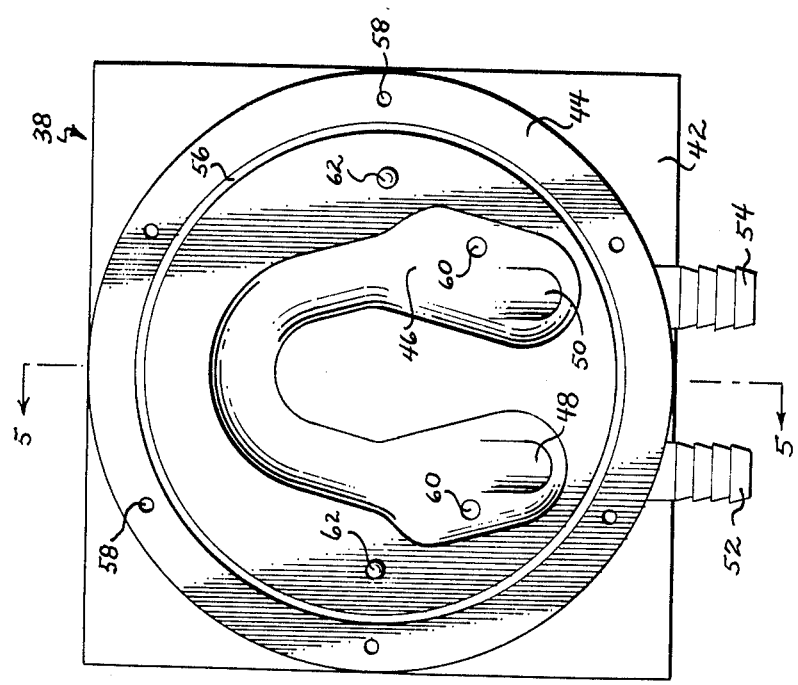
FIG. 2 is a plan view of the base of a lamp holder assembly housing.

Looking at FIG. 2, the housing base 38 has a base plate 42 and an upwardly extending circular portion 44 within which is formed a lamp coolant channel 46.

Coolant inlets/outlets 48 and 50 are fluidly coupled to corresponding hose fittings 52 and 54. An annular gasket channel 56 surrounds the lamp/coolant channel 46. Fastener holes 58 are provided in the periphery of the upwardly extending portion of 44 to permit securing the cover and base portion together in superposed relationship as shown in FIG. 5.

Apertures 60 are provided in the lamp/coolant channel for electrical power leads (not shown) that are secured to the lamp holder terminals 28.

It has already been mentioned that one of the objects of the present invention is to provide an accurate positioning of an arcuate lamp with respect to an optical system. Looking at FIGS. 1, 2, and 4, the lamp holder assembly housing base has two upwardly extending locator pins 62 that are cooperatively operative with corresponding locator pin apertures 63 formed in the lamp holder assembly 10. It can be seen that when the lamp holder assembly 10 is positioned so that pins 62 engage locator pin holes 63, the arcuate lamp 14 will be accurately positioned with respect to the housing base and positioned within the arcuate portion of the lamp/coolant channel 46. The housing base in turn positionally is referenced to an optical system (not shown) by conventional means.

Figure 3:
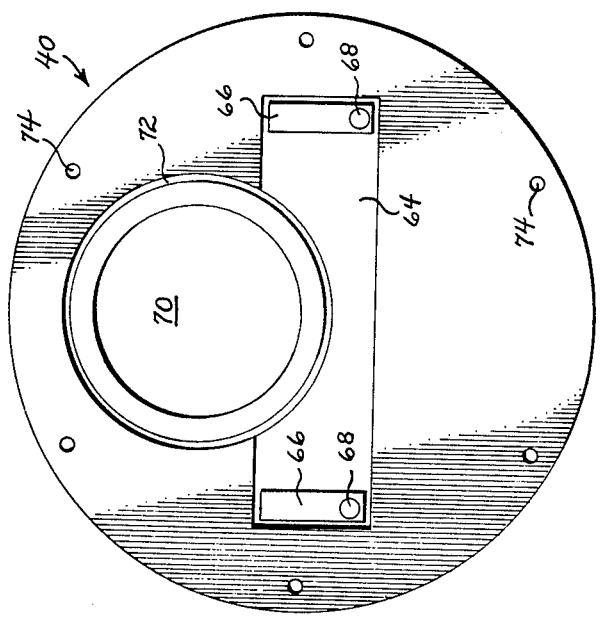
FIG. 3 is a bottom view of the cover of the lamp holder assembly housing.

Once the lamp holder assembly 10 has been positioned on the housing base, cover 40 is assembled in superposed relation over the lamp holder assembly as shown in FIG. 5. The cover 40, as best seen in FIG. 3, has a lamp holder base receiving channel 64 within which are positioned two springs 66 that are secured to the cover by means of fasteners 68. Springs 66 bear against the lamp holder base 18 when the cover is assembled in superposed relation with respect to the lamp holder assembly and base 38.

The cover 40 has a circular window 70 that overlies the arcuate portion of lamp 14, as best seen in FIG. 5. Surrounding window 70 is a gasket channel 72. The cover 40 also has a plurality of circumferentially spaced fastener apertures 74 that correspond in location to the fastener apertures 58 in the base 38.

Referring to FIG. 5, a glass plate 76 extends across the cover window 70 over the arcuate lamp 14. Gaskets 78 fluidily seal the lamp/coolant channel 46 and glass plate 76. A suitable coolant flow is provided through coolant hoses 53, one of which is shown in FIG. 5 and which have been omitted in FIG. 2 for purposes of clarity.

Figure 4:
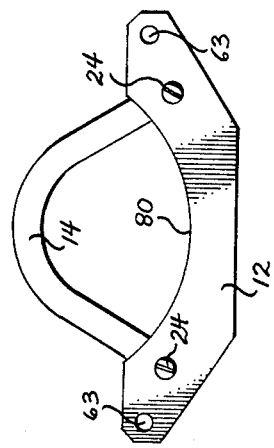
FIG. 4 is a plan view of the lamp holder assembly of FIG. 1 showing the lamp holder assembly in position for placement on the base of the lamp holder assembly housing.

It is desirable that the relatively delicate arcuate lamp 14 should not be directly handled during installation of the lamp holder assembly in housing 36. In order to avoid such handling, the lamp holder 12 is provided with a finger grip portion or "saddle" 80, as shown in FIGS. 1 and 4.

Having described in detail a preferred embodiment of our invention, it will now be obvious to those skilled in the art that numerous modifications can be made therein without departing from the scope of the invention as defined in the following claims.

We claim:

1. A lamp holder for a capillary, gas discharge arcuate lamp having electrical contacts at each end thereof, said lamp holder comprising:
   a generally planar base means capable of being fixed in position relative to an optical system;
   a first electrically conductive, current carrying lamp support adapted to secure one end of the arcuate lamp with respect to said base means, said first electrically conductive, current carrying lamp support having a generally planar, relatively flexible portion that lies in a plane generally perpendicular to the plane of said base means; and,
   a second electrically conductive, current carrying lamp support adapted to secure the other end of the arcuate lamp with respect to said base means in spaced relation to said first electrically conductive, current carrying lamp support, said second electrically conductive, current carrying lamp support having a generally planar, relatively flexible portion that lies in a plane generally parallel to the plane of said base means, whereby the arcuate lamp is free to distort relative to the base means during operation.

2. A lamp holder assembly comprising:
   (a) a capillary, gas discharge arcuate lamp having electrically conductive contacts at each end thereof; and,
   (b) a lamp holder comprising
      a generally planar base means capable of being fixed in position relative to an optical system;
      a first electrically conductive, current carrying lamp support adapted to secure one end of the arcuate lamp with respect to said base means, said first electrically conductive, current carrying lamp support having a generally planar, relatively flexible portion that lies in a plane generally perpendicular to the plane of said base means; and,
      a second electrically conductive, current carrying lamp support adapted to secure the other end of said arcuate lamp with respect to said base means in spaced relation to said first electrically conductive, current carrying lamp support, said second electrically conductive, current carrying lamp support having a generally planar, relatively flexible portion that lies in a plane generally parallel to the plane of said base means, whereby the arcuate lamp is free to distort relative to the base means during operation.

3. A lamp holder assembly and housing comprising, in combination:
   1. a lamp holder assembly having
      (a) a capillary gas discharge arcuate lamp having electrically conductive contacts at each end thereof;
      (b) a lamp holder comprising
         a generally planar base means;
         a first electrically conductive, current carrying lamp support adapted to secure one end of the arcuate lamp with respect to said base means, said first electrically conductive current carrying lamp support having a generally planar, relatively flexible portion that lies in a plane generally perpendicular to the plane of said base means; and,
         a second electrically conductive current carrying lamp adapted to secure the other end of the arcuate lamp with respect to said base means in spaced relation to said first electrically conductive, current carrying lamp support, said second electrically conductive, current carrying lamp support having a generally planar, relatively flexible portion that lies in a plane generally parallel to the plane of said base means, whereby the arcuate lamp is free to distort relative to the base means during operation; and, positional registration means in said base means;

2. a lamp holder assembly housing having
a base means unit with means cooperatively operative with said lamp holder positional registration means for accurately and repeatedly positioning the lamp holder and arcuate lamp with respect to said base unit; and
a cover means for covering the lamp holder and lamp when they are positioned on said base unit.

4. The combination of claim 3 further comprising said base unit having means defining an arcuate coolant channel for said arcuate lamp and inlet and outlet means fluidly coupled to said coolant channel.

5. A lamp holder for an arcuate lamp having first and second electrical contacts that are spaced apart along the arc of the arcuate lamp, said lamp holder comprising:
a generally planar base means capable of being fixed in position relative to an optical system;
a first electrically conductive, current carrying lamp support mounted on said base means and adapted to secure the arcuate lamp first electrical contact with respect to said base means, said first lamp support having a generally planar, relatively flexible lamp contacting portion that lies in a plane generally perpendicular to the plane of said base means; and,
a second electrically conductive, current carrying lamp support mounted on said base means in spaced relation to said first electrically conductive, current carrying lamp support and adapted to secure the arcuate lamp second electrical contact with respect to said base means, said second electrically conductive, current carrying lamp support having a generally planar, relativelyflexible lamp contacting portion that lies in a plane generally parallel to the plane of said base means whereby the arcuate lamp is free to distort relative to the base means during operation.

6. A lamp holder assembly comprising:
(a) a lamp holder comprising
a generally planar base means capable to being fixed in position relative to an optical system;
a first electrically conductive current carrying lamp support mounted on said base means, said first electrically conductive, current carrying lamp support having a generally planar, relatively flexible lamp contacting portion that lies in a plane generally perpendicular to the plane of said base means; and,
a second electrically conductive, current carrying lamp support mounted on said base means in spaced relation to said first electrically conductive, current carrying lamp support, said second electrically conductive, current carrying lamp support having a generally planar, relatively flexible lamp contacting portion that lies in a plane generally parallel to the plane of said base means;

(b) an arcuate lamp having first and second, electrically conductive terminals that are spaced along the arc of the arcuate lamp; and, (c) means for securing said first and second electrically conductive lamp terminals to said first and second electrically conductive, current carrying lamp supports.

7. A lamp holder assembly and housing comprising, in combination:
1. a lamp holder assembly having
(a) a lamp holder comprising
a generally planar base means;
a first electrically conductive, current carrying lamp support mounted on said base means, said first electrically conductive, current carrying lamp support having a generally planar, relatively flexible lamp contacting portion that lies in a plane generally perpendicular to the plane of said base means;
a second electrically conductive, current carrying lamp support mounted on said base means in spaced relation to said first electrically conductive, current carrying lamp support, said second electrically conductive, current carrying lamp support having a generally planar, relatively flexible lamp contacting portion that lies in a plane generally parallel to the plane of said base means; and,
positional registration means in said base means,
(b) an arcuate lamp having first and second electrically conductive terminals that are spaced along the arc of the arcuate lamp;
(c) means for securing said first and second electrically conductive lamp terminals to said first and second electrically conductive, current carrying lamp supports;

2. a lamp holder assembly housing having a base unit with means cooperatively operative with said lamp holder registration means for accurately and repeatedly positioning the lamp holder and lamp with respect to said base unit; and
a cover means for covering the lamp holder and lamp when they are positioned on said base unit.

8. The combination of claim 7 further comprising said base unit having means defining a coolant channel for said arcuate lamp and inlet and outlet means fluidly coupled to said coolant channel.

* * * * *